(12) United States Patent
Foster et al.

(10) Patent No.: US 8,100,803 B2
(45) Date of Patent: Jan. 24, 2012

(54) HYDRAULIC CLUTCH CONTROL MECHANISM FOR A MULTI-MODE HYBRID TRANSMISSION

(75) Inventors: Michael D. Foster, Carmel, IN (US); Jy-Jen F. Sah, West Bloomfield, MI (US); Peter E. Wu, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 699 days.

(21) Appl. No.: 12/250,919

(22) Filed: Oct. 14, 2008

(65) Prior Publication Data

US 2010/0093477 A1 Apr. 15, 2010

(51) Int. Cl.
*F16H 31/00* (2006.01)

(52) U.S. Cl. ........ 475/116; 475/118; 475/120; 475/122; 475/123; 475/127

(58) Field of Classification Search .................. 475/116, 475/118–124, 127, 128; 137/625
See application file for complete search history.

(56) References Cited

U.S. PATENT DOCUMENTS

| 4,148,231 | A | * | 4/1979 | Redzinski | 477/63 |
|---|---|---|---|---|---|
| 4,351,206 | A | * | 9/1982 | Lemieux et al. | 477/134 |
| 5,351,570 | A | * | 10/1994 | Mizunuma et al. | 74/335 |
| 5,762,580 | A | * | 6/1998 | Walega et al. | 477/130 |
| 5,941,794 | A | * | 8/1999 | Jang | 477/143 |
| 5,956,999 | A | * | 9/1999 | Okada et al. | 74/336 R |
| 5,957,810 | A | * | 9/1999 | Ohashi et al. | 477/154 |
| 2006/0246794 | A1 | * | 11/2006 | Foster et al. | 440/86 |

* cited by examiner

*Primary Examiner* — Tisha Lewis
(74) *Attorney, Agent, or Firm* — Quinn Law Group, PLLC

(57) ABSTRACT

An electrically variable transmission (EVT) selectively establishes various EVT modes and a neutral mode. The EVT includes a source of pressurized fluid, fluid-actuated clutches, various solenoid-actuated valves including trim valves and blocking valves adapted to control a flow of pressurized fluid to the clutches to establish the transmission operating modes, and an electronic control unit (ECU). The ECU actuates different combinations of the solenoid-actuated valves to establish the different transmission modes. The solenoid-actuated valves are configured in such a manner as to provide the EVT with one or more default operating modes in the event the ECU temporarily loses electrical power. Depending on the particular configuration, the default modes can be the neutral mode alone, or the neutral mode combined with one or more of the EVT modes, with the EVT modes enabled by providing one or both of the blocking valves with a latching feature.

6 Claims, 4 Drawing Sheets

| MODE | C1 | C2 | C3 | C4 |
|------|----|----|----|----|
| M1 | X | O | X | O |
| G1 | X | O | X | X |
| M2 | X | O | O | X |
| G2 | X | X | O | X |
| M3 | O | X | O | X |
| G3 | O | X | X | X |
| M4 | O | X | X | O |

| HCM | X | Y | PCS1 | PCS2 | PCS3 | PCS4 | PF DEFAULT |
|-----|---|---|------|------|------|------|------------|
| 140 |   |   | NC | NO | NO | NC | N |
| 240 |   | L | NC | NO | NC | NO | N; M3 |
| 340 | L | L | NO | NC | NO | NC | N; M1; M4 |

|  | N/C PCS1 | N/O PCS2 | N/O PCS3 | N/C PCS4 | X BLK | Y BLK |
|---|---|---|---|---|---|---|
| ALL AVAILABLE | C1 | C2 | C3 | C4 | 1 | 1 |
| M3/G3/M4 | ~~C1~~ | C2 | C3 | C4 | 0 | 1 |
| C3/C4 NEUTRAL | ~~C1~~ | ~~C2~~ | C3 | C4 | 0 | 0 |
| M2 | C1 | ~~C2~~ | ~~C3~~ | C4 | 1 | 0 |

*Fig-5A*

|  | N/C PCS1 | N/O PCS2 | N/C PCS3 | N/O PCS4 | X BLK | Y BLK |
|---|---|---|---|---|---|---|
| ALL AVAILABLE | C1 | C2 | C3 | C4 | 0 | 0 |
| M3/G3/M4 | ~~C1~~ | C2 | C3 | C4 | 1 | 0 |
| C4 NEUTRAL | ~~C1~~ | ~~C2~~ | ~~C3~~ | C4 | 1 | L |
| M2 | C1 | ~~C2~~ | ~~C3~~ | C4 | 0 | L |

*Fig-5B*

|  | N/O PCS1 | N/C PCS2 | N/O PCS3 | N/C PCS4 | Hot Main | X BLK | Y BLK |  |
|---|---|---|---|---|---|---|---|---|
| ALL AVAILABLE | C1 | C2 | C3 | C4 |  | 0 | 0 | MODE 1 |
| M3/G3/M4 | ~~C1~~ |  | C3 | C4 | C2 | L | 0 | MODE 4 |
| M3 | ~~C1~~ |  | ~~C3~~ | C4 | C2 | L | L | C2 NEUT |
| M2 | C1 | ~~C2~~ | ~~C3~~ | C4 |  | 0 | L | C1 NEUT |

*Fig-5C*

HYDRAULIC CLUTCH CONTROL MECHANISM FOR A MULTI-MODE HYBRID TRANSMISSION

TECHNICAL FIELD

The present invention relates generally to a hydraulic control module providing one or more power failure default operating modes in an electrically variable transmission.

BACKGROUND OF THE INVENTION

In a powertrain for a hybrid electric vehicle (HEV), an internal combustion engine and one or more electric motor/generator units selectively operate individually or together to propel the HEV. Power output from the engine and the motor/generators is transferred through gearing in a multi-speed transmission to a final drive unit. The primary function of a multi-speed transmission is to regulate the speed and torque distribution in the powertrain to meet vehicle speed and acceleration requirements.

An electrically variable transmission (EVT) in particular provides a continuously variable speed ratio, and can provide a direct mechanical path between the engine and the final drive unit. An EVT can operate with engine operation being mechanically independent from operation of the final drive unit or in various mechanical/electrical split contributions to thereby enable one or more high-torque continuously variable speed ratios, electrically-dominated vehicle launches, regenerative braking, engine off idling, and multi-mode operation.

A typical multi-mode hybrid vehicle having an EVT uses a transmission controller to enable selection of multiple EVT modes, fixed gear modes, and a neutral mode or modes, with various torque transmitting mechanisms or clutches being selectively actuated to provide a smooth transition between the available driving ratios. A supply of pressurized fluid is provided to the EVT for controlled actuation of the various clutches and other hydraulic components, and to establish the different speed ratios within the internal gear arrangement. The pressurized fluid may also be used for such additional functions as cooling and lubrication, as is known in the art.

The various hydraulic subsystems of a power transmission can be controlled via an electro-hydraulic control module, or HCM. The HCM, in collaboration with an electronic control unit or ECU, regulates the flow of pressurized fluid for cooling and lubricating the transmission components, and the selective pressurization of the various torque-transmitting mechanisms to enable transmission shifting. The HCM engages/actuates or disengages/deactivates the various transmission subsystems through the manipulation of hydraulic pressure generated within the transmission oil pump assembly using a plurality of valves. The valves used in a conventional hydraulic control circuit commonly comprise electro-hydraulic devices or solenoids, spring-biased accumulators, spring-biased spool valves, and/or ball check valves. However, conventional valve configurations and control methodologies may be less than optimal when used with an HEV having an EVT.

SUMMARY OF THE INVENTION

Accordingly, an EVT is provided having an HCM that is adapted to provide at least one default operating mode in the event of a temporary power failure at the ECU. In such a power failure, certain electrically-actuated solenoid valves will default to predetermined states or positions to provide the at least one default operating mode. In one embodiment, a neutral default mode is available, while in other embodiments the neutral default mode is accompanied by one or more EVT modes, depending on the operating state or mode of the EVT at the time of the ECU power failure.

In particular, the electrically variable transmission (EVT) selectively establishes a plurality of different transmission operating state or modes including a plurality of forward EVT modes and a neutral mode. The EVT includes a source of pressurized fluid, a plurality of fluid-actuated clutches, and a hydraulic control module (HCM) having an electronic control unit (ECU) adapted for selecting one of the different transmission modes based at least partially on a speed of the vehicle. Solenoid-actuated valves control a flow of pressurized fluid to the clutches, the positioning of a pair of normally-open solenoid devices and a pair of blocking valves at particular locations in the HCM allows the EVT to default to one or more default modes in the event of an electrical power failure at the ECU. By providing one or more of the blocking valves with a latching feature allowing the blocking valve to be held in position once actuated, one or more of the EVT modes are enabled.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 5A is a table describing the blocking sequence usable with the HCM of FIG. 2A;

FIG. 5B is a table describing the blocking sequence usable with the HCM of FIG. 2B; and FIG. 5C is a table describing the blocking sequence usable with the HCM of FIG. 2C.

DESCRIPTION OF THE PREFERRED EMBODIMENTS

Figure 1:
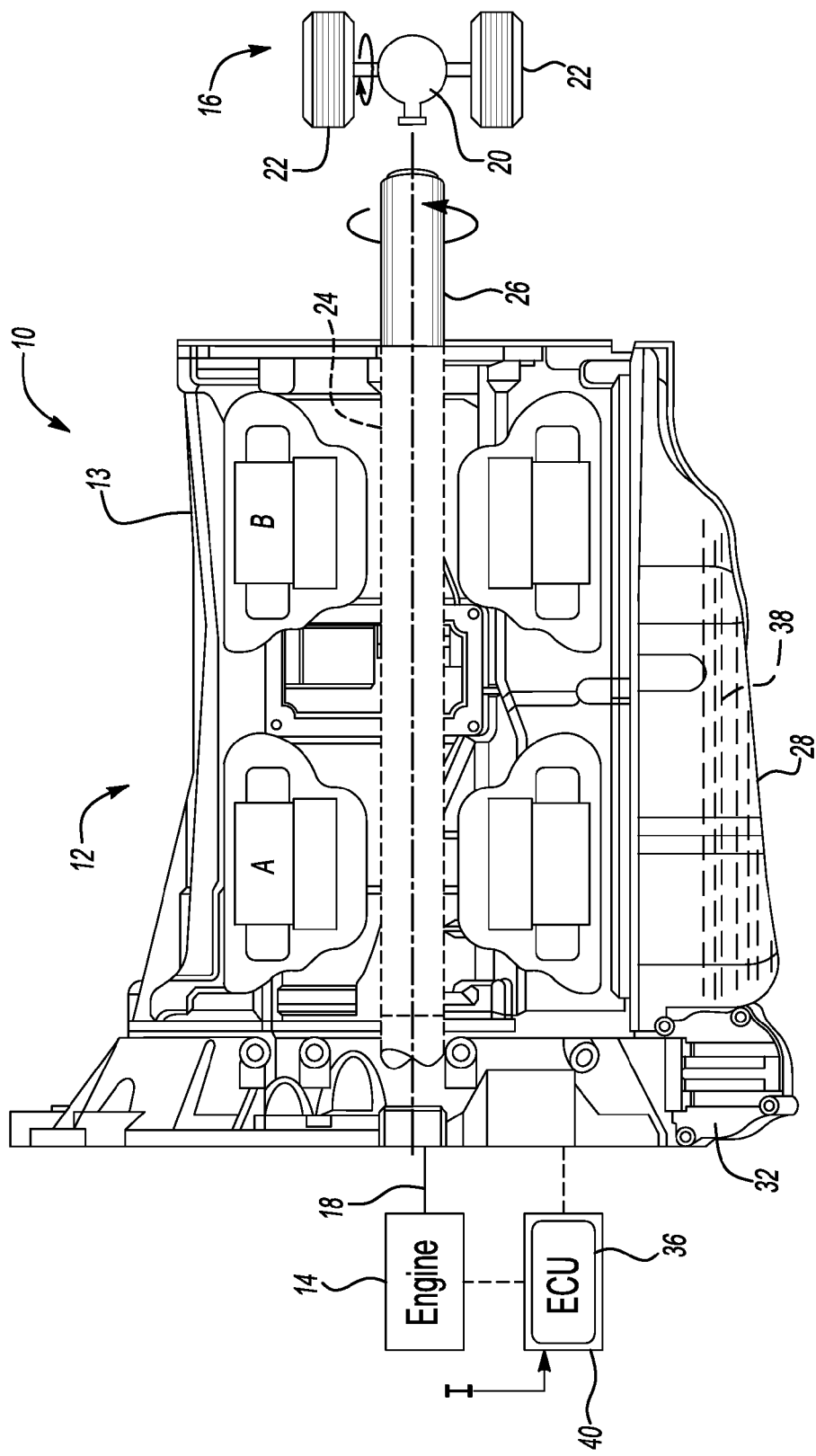
FIG. 1 is schematic illustration of a hybrid powertrain in accordance with the invention.

Referring to the drawings, wherein like reference numbers refer to like components throughout the several views, and beginning with FIG. 1, an exemplary vehicle powertrain 10 includes an internal combustion engine 14 that is drivingly connected to, or in power flow communication with, a final drive unit 16 via an electrically-variable hybrid power transmission 12, hereinafter referred to simply as the EVT 12. The EVT 12 can be configured to include multiple EVT modes and fixed gear modes. In an exemplary embodiment, the EVT 12 includes four EVT modes, referred to respectively in order of increasing speed and decreasing torque capabilities as M1-M4, and three fixed gear modes, likewise referred to respectively as G1-G3. The EVT 12 is controlled via a transmission control module or electronic control unit ECU 36, which as the name makes clear is electrically powered.

Because of this, a power outage or power failure at the ECU, however transient, will affect the operation of the EVT. In accordance with the invention, the EVT 12 provides one or more default operating modes in the event of such a power failure at the ECU, as will be explained in more detail with reference to FIGS. 2A-C.

The engine 14 includes an output member or crankshaft 18 for transferring power or engine torque to the EVT 12. The EVT 12, in turn, distributes torque via a transmission output member or driveshaft 26 in order to power or drive the final drive unit 16, represented herein by a rear differential 20 and drive wheels 22. In the embodiment depicted in FIG. 1, the engine 14 may be any prime mover, such as, but not limited to, a diesel engine, gasoline, or alternative fuel engine. Although not illustrated in FIG. 1, it should be appreciated that the final drive unit 16 may provide any known configuration, such as a front wheel drive (FWD), a rear wheel drive (RWD), a four-wheel drive (4WD), or an all-wheel drive (AWD) configuration.

Figure 2A:
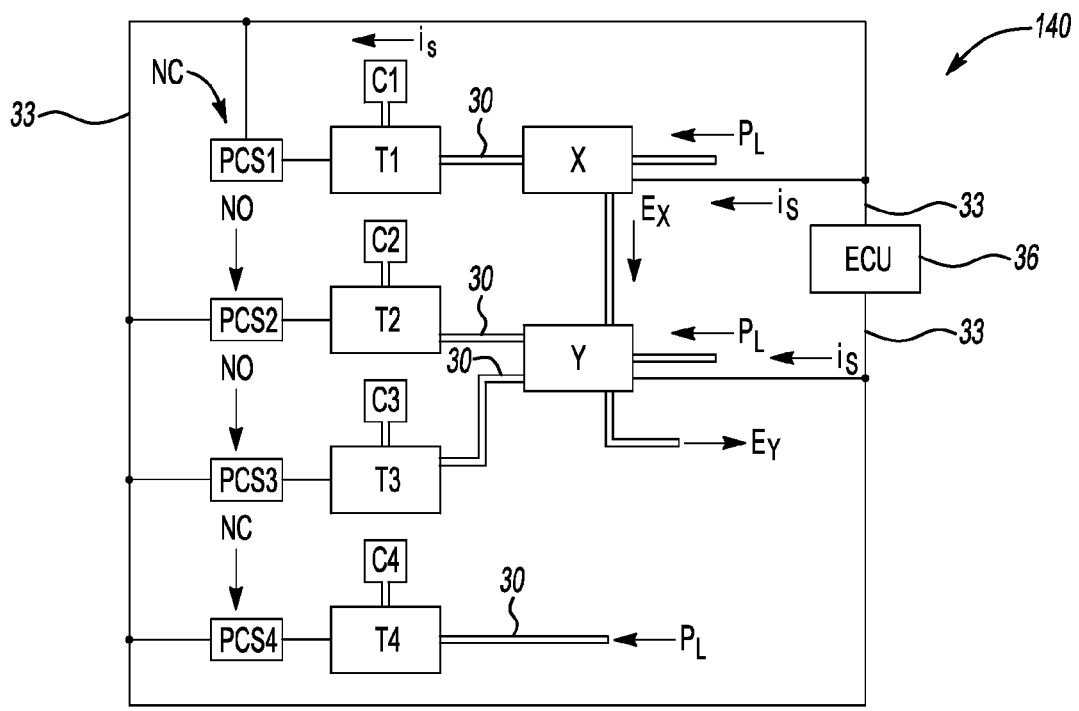
FIG. 2A is a schematic illustration of a hydraulic control module (HCM) usable with the powertrain of FIG. 1.
Figure 2B:
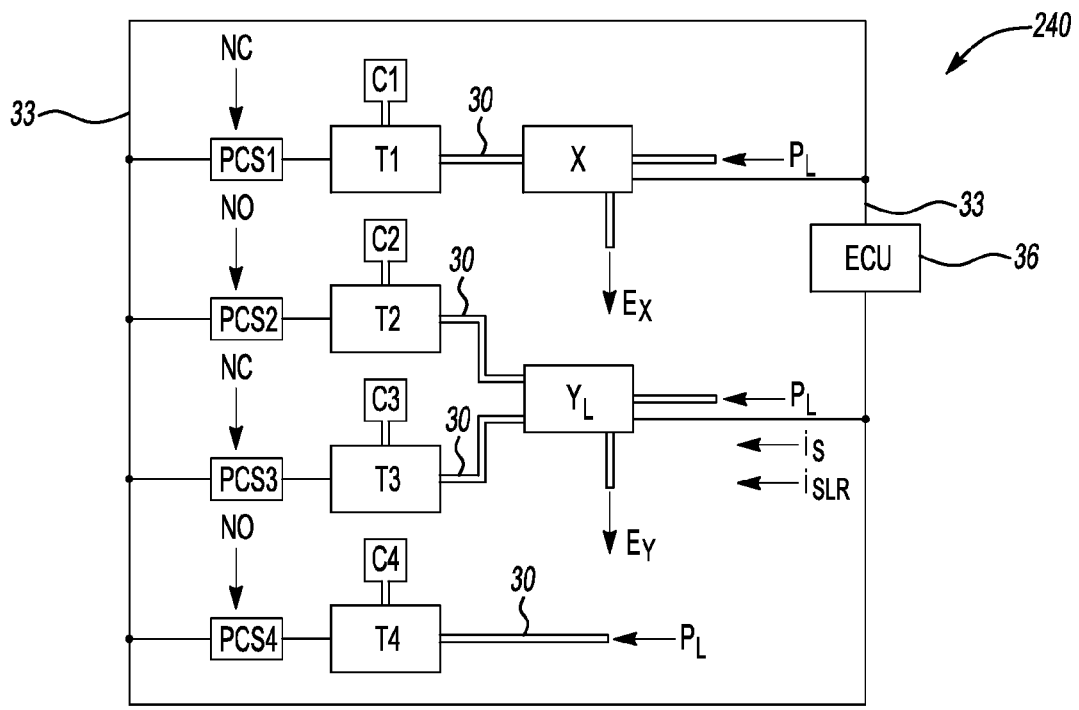
FIG. 2B is a schematic illustration of an alternate HCM usable with the powertrain of FIG. 1.
Figures 2C, 3, 4:
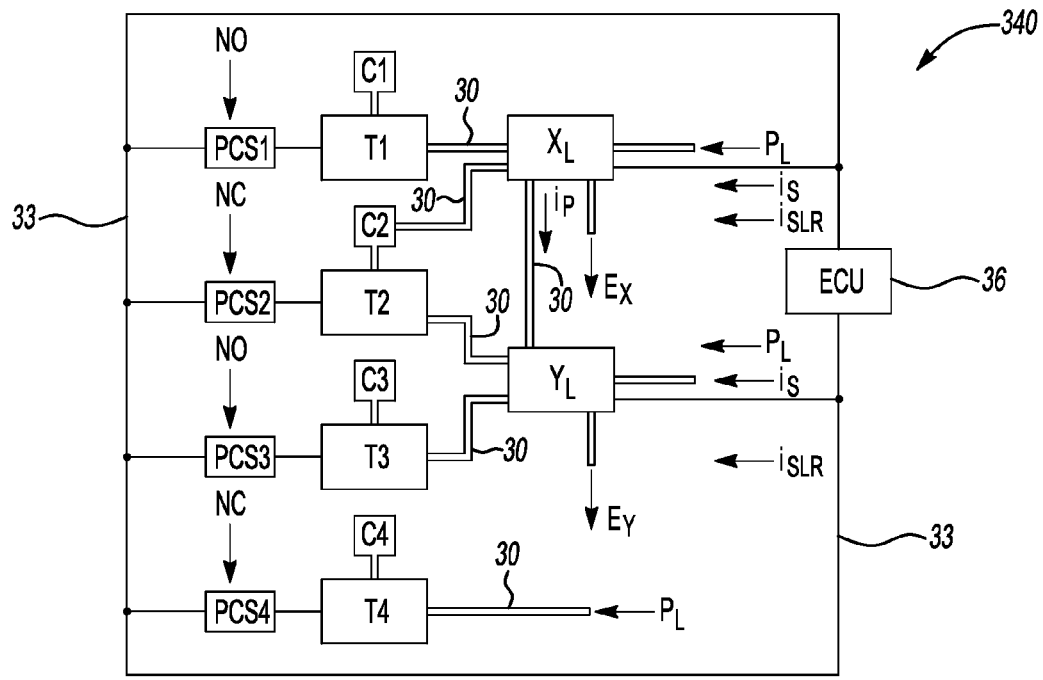
FIG. 2C is a schematic illustration of another alternate HCM usable with the powertrain of FIG. 1.
FIG. 3 is a truth table describing the various transmission operating states or modes for the vehicle of FIG. 1.
FIG. 4 is a table describing the various default transmission operating modes enabled by the HCM of FIG. 2.

The EVT 12 is adapted to manipulate and distribute power from the engine 14 to the final drive unit 16. Specifically, engagement of one or more torque transmitting devices, hereinafter referred to as clutches C1-C4 for simplicity and shown in FIGS. 2A-C, are included in the EVT 12, with the clutches C1-C4 interconnecting one or more gear members of various planetary gear sets (not shown) in the EVT 12 to thereby transfer power from the engine 14 to the output shaft 26 at varying speed ratios. The EVT 12 may utilize one or more planetary gear sets in collaboration with, or independent of, one or more of the clutches C1-C4 in order to provide input split, compound split, and/or fixed ratio modes of operation as needed.

The EVT 12 includes a main housing 13 encasing and protecting first and a second electric motor/generator assemblies, labeled in FIG. 1 as A and B, respectively. The motor/generators A, B are connected to a main shaft of the EVT 12, shown hidden at 24, preferably through a series of planetary gear sets. As will be understood by those of ordinary skill in the art, the motor/generators A, B can operate in conjunction with such planetary gear sets and the selectively engageable clutches C1-C4 (see FIGS. 2A-C) to rotate the output shaft 26. The motor/generators A, B can alternately operate as a motor and a generator as needed depending on their commanded power flow direction. That is, the motor/generators A, B are each capable of converting electrical energy to mechanical energy for vehicle propulsion or for powering onboard electrical systems (not shown), as well as for converting mechanical energy to electrical energy during regenerative braking to recharge an energy storage system (not shown).

Still referring to FIG. 1, a fluid sump 28 provides a suitable hydraulic fluid reservoir, and is located on a lower portion or base of the main housing 13. The sump 28 holds a ready supply of hydraulic fluid 38, shown hidden in FIG. 1, for circulation within the EVT 12. Additionally, an auxiliary or secondary transmission pump 32 is mounted to the main housing 13. The auxiliary oil pump 32 is in fluid communication with the EVT 12 via hydraulic circuitry in order to provide a pressurized supply of fluid to the EVT 12 during specific operating conditions, such as during an engine-off mode and when transitioning thereto and therefrom.

As stated above, the various hydraulically-actuated components of the EVT 12 are controlled by a transmission electro-hydraulic control module or HCM 40, which includes an electronic portion primarily defined by the ECU 36, such as a microprocessor-based electronic control unit of conventional architecture. The ECU 36 is in operative communication with the EVT 12 and the various constituent parts of the HCM 40, and operable at least in part for controlling the individual and cooperative operation thereof Because the ECU 36 is an electronic component, an unexpected power failure to the ECU 36 makes the ECU 36 temporarily unavailable. Within the scope of the invention, therefore, the configuration of the HCM 40 shown in FIGS. 2A-C automatically establishes one or more default EVT operating modes during such an ECU power failure to thereby enable continuous operation of the HEV 10.

The ECU 36 controls the operation of the EVT 12 based on a number of different inputs (arrow I) to achieve a desired transmission speed ratio. Such inputs (arrow I) may include, but are not necessarily limited to: signals representing the transmission input speed, a driver torque command, the transmission output speed, and the hydraulic fluid temperature. Those skilled in the art will recognize and understand that the means of communication utilized by the ECU 36 is not restricted to the use of electric cables or wiring, i.e., "by wire", but may be by radio frequency (RF) and other wireless technology, fiber optic cabling, etc.

Referring to FIGS. 2A-C, various embodiments of the HCM 40 of FIG. 1 are shown in partial schematic view as the HCM 140, 240, and 340, respectively. The HCM 140, 240, and 340 differ only in the specific allocation of the normally-closed (NC) control solenoids with respect to the trim valves T1-T4, and in the specific configuration of two blocking valves X and Y, as will be now be explained with reference to FIGS. 2A-C generally.

The HCM 40, whether configured as the HCM 140, 240, or 340 of FIGS. 2A-C, respectively, is in fluid communication with one or more pump assemblies, such as the pump 32 of FIG. 1, and various pressure regulators and solenoid-operated fluid control devices to develop a regulated pressure line (L). The HCM 140, 240, 340 includes a plurality of clutch control valves, including a respective first, second, third, and fourth trim valves abbreviated T1-T4. The numbering of the trim valves T1-T4 (i.e., first, second, third, fourth) may be modified without departing from the scope and spirit of the present invention, and therefore should not be considered limiting. Each trim valve T1-T4 corresponds at least to a particular clutch C1-C4, and is operable for actuating at least one of the clutches C1-C4 in the EVT 12.

Each trim valve T1-T4 is selectively actuated or stroked using a dedicated proportional control solenoid device, respectively abbreviated as PCS1-PCS4. Within the scope of the invention, the solenoid devices PCS1-PCS4 are configured as normally-open (NO) or normally-closed (NC) solenoids, depending on the particular embodiment, also as shown in FIG. 4 and explained below. As will be understood by those of ordinary skill in the art, a "normally-open" (NO) solenoid allows the device to fail in the open state, such that fluid pressure remains supplied to an associated trim valve T1-T4 when the solenoid device PCS1-PCS4 is not energized, while a normally-closed (NC) device fails in a closed state and thus prevents fluid pressure from being supplied to the trim valve T1-T4 when the solenoid device PCS1-PCS4 is not energized. That is, a power failure at the ECU 36 of FIG. 1 will cause a NO solenoid device to remain open, while an NC solenoid device will close in response to the power failure.

Accordingly, by selectively controlling the trim valves T1-T4 via the solenoid devices PCS1-PCS4, line pressure ($P_L$) can be supplied to one or more of the trim valves T1-T4 during a transient or temporary power failure at the ECU 36 of FIG. 1. This in turn allows selected ones of the clutches C1-C4 to actuate and transmit torque in order to establish one or more of the default EVT operating modes during the power failure.

When the trim valves T1-T4 de-stroke, the clutch cavity of the respective clutch C1-C4 is thereby exhausted, thus disabling that particular clutch. For example, the first of the trim valves T1 is in fluid communication with both the sump 28 via a blocking valve X and the clutch C1. The first trim valve T1 is therefore configured to selectively actuate the clutch C1. In a similar respect, the second, third, and fourth trim valves T2-T4 are each in fluid communication with a respective clutch C2-C4, and the sump 28 via one or more of the blocking valves X and Y. Moreover, each trim valve T2-T4 is configured to selectively actuate its respective clutch C2-C4 during a power failure at the ECU 36 of FIG. 1 depending on the position of the blocking valve X, Y at the instant of the power failure, as well as the specific configuration of the solenoid devices PCS1-PCS4.

With respect to the first and second blocking valves X and Y, respectively, these devices combine to selectively block the feed of line pressure ($P_L$) to the trim valves T1-T3. The blocking valves X and/or Y can be configured either as on/off-type or as latching-type valves which must be selectively stroked and destroked. As will be understood by those of ordinary skill in the art, a latching-type valve is capable of latching or locking itself into a particular state using line pressure ($P_L$) or another suitable pressure signal once actuated, thus holding that mode until receipt of a subsequent pressure signal commanding a release of the latch. However configured, the blocking valves X, Y can be configured as normally-closed (NC) devices, such that the devices are in an "off" position ordinarily, and thus a solenoid device (not shown) controlling the operation of the blocking valve X, Y requires power in the form of electricity to actuate or shift the blocking valve to an "on" position.

Within the scope of the invention, the blocking valves X and Y and the solenoid devices PCS1-PCS4 are selectively mechanized to provide at least a neutral (N) default operating mode, and optionally one or more default forward EVT modes, whenever power is lost to the ECU 36, as discussed above. The HCM 140 of FIG. 2A provides a single neutral (N) default mode during such a power failure. The HCM 240 of FIG. 2B provides the neutral default mode in addition to a single default EVT mode. Finally, the HCM 340 of FIG. 2C provides the neutral (N) default mode and a pair of default EVT modes. Each of the HCM 140, 240, and 340 will now be described in turn with reference to FIGS. 2A-C.

Referring FIG. 2A, the HCM 140 is shown in partial schematic view with the blocking valves X, Y fed by line pressure ($P_L$) as described above. Each blocking valve X, Y has an exhaust port ($E_X$, $E_Y$) suitable for discharging or exhausting the fluid as needed. The blocking valves X, Y are on/off-type normally-closed (NC) solenoid-controlled devices, and are therefore adapted to actuate or turn on and off in response to electrical signals ($i_s$) from the ECU 36 transmitted via a circuit path 33, whether the circuit path 33 is hard wired or wireless.

The blocking valve X is in fluid communication with the trim valve T1, potentially feeding the clutch C1 when the blocking valve X is in an "on" state depending on the state of the trim valve T1. When the blocking valve X is off, it blocks the feed to the trim valve T1 and exhausts the line pressure ($P_L$) to the trim valve T3. When on, the blocking valve X passes line pressure ($P_L$) to the trim valve T1, thus potentially feeding the clutch C1 depending on the state of the trim valve T1. The blocking valve Y in turn is in fluid communication with the trim valves T2, T3 via a conduit 30, and is configured to block the feed to the trim valve T2, and potentially the trim valve T3, when the blocking valve Y is turned off. When turned on, the blocking valve Y feeds each of the trim valves T2 and T3, thus potentially feeding the clutches C2 and C3, respectively, depending on the respective state of the trim valves T2 and T3. The trim valve T4 is in fluid communication with line pressure ($P_L$). In the HCM 140, the solenoid devices PCS1 and PCS4 are normally-closed (NC) devices, and thus fail in a closed state when power is lost to the ECU 36.

Referring to FIG. 2B, the HCM 240 is shown in partial schematic view with the blocking valves X, Y fed by line pressure ($P_L$). The blocking valve X is an on/off-type normally-closed solenoid-controlled device, and is therefore adapted to actuate or turn on and off in response to electrical signals ($i_s$) from the ECU 36 transmitted via the circuit path 33. The blocking valve Y is configured as a latching-type device as described above. That is, once the blocking valve Y is turned on, line pressure ($P_L$) actuates or sets a latch within the blocking valve Y to thereby lock or hold the blocking valve Y in that position. To release the latch, a latch release signal ($i_{SLR}$) is transmitted by the ECU 36 to a separate solenoid device (not shown), which ultimately causes fluid pressure to be admitted to the blocking valve Y in a manner sufficient for overcoming the line pressure ($P_L$) in response to the latch release signal ($i_{SLR}$).

The blocking valve X is in fluid communication with the trim valve T1, potentially feeding the clutch C1 when the blocking valve X is in an off state. When turned on, the blocking valve X blocks the trim valve T1, and ultimately the clutch C1. The blocking valve Y, in turn, is in fluid communication with the trim valves T2, T3 via conduit 30, and is configured to feed to the trim valves T2, T3 when turned off. When turned on, the blocking valve Y blocks the feed to each of the trim valves T2 and T3, thus preventing use of the clutches C2 and C3, respectively. When the blocking valve Y is on, its latching feature is activated, as explained above, and a latch release signal ($I_{SLR}$) is required to release the latching feature. As with the HCM 140 of FIG. 2A, the trim valve T4 is in fluid communication with line pressure ($P_L$). In the HCM 240, the solenoid devices PCS1 and PCS3 are normally-closed (NC) devices, and close when power is lost to the ECU 36.

Referring to FIG. 2C, the HCM 340 is shown in partial schematic view with the blocking valves X, Y fed by line pressure ($P_L$). The blocking valves X, Y are each configured as a latching-type device as described above. The blocking valve X is in fluid communication with the trim valves T1 and T2, with the blocking valve X feeding the trim valve T1 when in an off state. When turned on, the blocking valve X blocks the feed to the trim valve T1, connects clutch C2 directly to line pressure ($P_L$), and latches into its present position as described above. The blocking valve Y, in turn, is in fluid communication with the trim valves T2, T3 via conduit 30, and is configured to feed to the trim valves T2, T3 when turned off. When turned on, the blocking valve Y blocks the feed to each of the trim valves T2 and T3, thus preventing use of the clutches C2 and C3, respectively. As with the blocking valve X, when turned on, the latching feature of blocking valve Y is activated, and a latch release signal ($i_{SLR}$) is required to subsequently release the latching feature. As with the TEHCM 140, 240 of FIGS. 2A, 2B, respectively, the trim valve T4 is in fluid communication with line pressure ($P_L$). In the HCM 340, the solenoid devices PCS2 and PCS4 are normally-closed (NC) devices, and thus close when power is lost to the ECU 36.

Referring to FIG. 3, within the EVT 12 of FIG. 1 the selective engagement of one or more of the clutches C1-C4 establishes four different EVT modes, referred to hereinafter as M1-M4 respectively, three fixed gears modes (G1-G3), and a neutral mode (N). The clutch C1 is applied in each of the modes M1, M2, G1, and G2, with the clutch C1 being released in all other modes. The clutch C2 is applied or engaged in each of the modes M3, M4, G2, and G3, with the clutch C2 being released in all other modes. The clutch C3 is applied or engaged in each of the modes M1, M4, G1, and G3, with the clutch C3 being released in all other modes. Finally, the clutch C4 is applied or engaged in M2, M3, and G1-3, with the clutch C4 being released in all other modes.

The four EVT mode operations (M1-4) for the EVT 12 of FIG. 1 are established when only two clutches, e.g., C1 and C2, or C3 and C4, are applied, where the speed of the first and second motor/generator assemblies A, B of FIG. 1 are used to vary the ratio between the speed of the engine 14 and the transmission output speed. The fixed gear modes G1-G3 are instances where three of the clutches C1-C4 are applied, and there is a fixed ratio between engine speed and transmission output speed, e.g., the EVT 12 of FIG. 1 is operating like a traditional step ratio automatic transmission.

As the vehicle operator commands higher and lower output speed/torque, the ECU 36 of FIG. 1 can navigate through the various EVT modes M1-M4 and fixed gear modes G1-G3 in order to produce the desired results. The mode-mode, gear-mode, gear-gear shifts are simply the type of shift being executed. For example, in an EVT mode 1-to-fixed gear 1 (M1/G1) shift, the EVT 12 of FIG. 1 transitions or shifts from operating in EVT Mode 1 (M1) with the first and third clutches (C1, C3) applied, to fixed gear mode 1 (G1) by adding the fourth clutch (C4).

Referring to FIG. 4, a table generally describes the HCM 140, 240, and 340 of FIGS. 2A-C, respectively. Each is operable for providing one or more default power failure modes, i.e., modes that are automatically executed in response to a power failure to the ECU 36 of FIG. 1. Where more than one default mode is enabled, the default is determined by the present state of the vehicle at the moment of the power failure.

In the HCM 140 of FIG. 2A, each of the blocking valves X and Y are normally-low (NL) on/off type solenoid devices. As described above with reference to FIG. 2A, the clutches C2 and C3 are controlled by normally-open (NO) solenoid devices, such that during a power failure (PF) each of the trim valves T2, T3 remain available for energizing the clutches C2, C3. When the blocking valves X, Y remain closed during a power failure, the line pressure to the trim valve T2, and thus clutch C2, is blocked, leaving only clutch C3 available for actuation. Therefore, regardless of the state of the clutch C3 at the time of the power failure, the EVT 12 of FIG. 1 is placed in a default neutral (N) condition during the predetermined power failure.

In the HCM 240 (see FIG. 2B), the blocking valve Y is a latching-type solenoid device. The clutches C2, C4 are controlled by normally-open (NO) solenoid devices PCS2 and PCS4, respectively, such that when a power failure occurs the clutches C2, C4 can be actuated if needed. When such a power failure occurs, the resultant default state or mode is one of a neutral state (N) or M3, depending on position or state of blocking valve Y at the time of the power failure, as determined by the present operating state of the EVT 12 at the instant of the power failure. Therefore, the EVT 12 of FIG. 1 is placed in one of two default states, N or M3, during the power failure to the ECU 36 of FIG. 1.

In the HCM 340 of FIG. 2C, the blocking valves X and Y are each latching-type solenoid devices. The clutches C1, C3 are controlled by normally-open (NO) solenoid devices PCS1 and PCS3, respectively, such that when a power failure occurs clutches C1, C3 can be actuated if needed. When a power failure occurs, the resultant default state or mode is a neutral state (N) or one of two different EVT modes, M1 and M4, depending on the position of blocking valves X and Y. Therefore, the EVT 12 of FIG. 1 is placed in one of three default states, N, M1, or M4 during the predetermined power failure, depending on the current state of the EVT 12 at the time of power failure. The blocking valve X can directly feed the clutch C2 under certain conditions, as described below, depending on a pressure control signal (arrow $i_P$).

Referring to FIGS. 5A-C, various blocking sequences are shown that are usable with the HCM 140, 240, and 340 of FIGS. 2A-C, respectively. Within the various boxes, a crossed-out clutch (C1-C3) represents a condition in which a pressure feed ($P_L$ in FIGS. 2A-C) to that particular trim valve T1-T3 is blocked by one or both of the blocking valves X, Y. Likewise, a notation of "0" or "1" with respect to the blocking valves X, Y represents a corresponding "off" or "on" state.

Referring to FIG. 5A in particular, with each of the blocking valves X, Y of FIG. 2A turned on, all four clutches C1-C4 are available. However, when the blocking valve X is turned off, the feed to trim valve T1 is blocked, and when the blocking valve Y is turned off, the feed to the trim valve T2 is blocked. In the event of a power failure at the ECU 36 of FIG. 1, therefore, neither of clutches C1 and C2 is available. Likewise, as the PCS 1 and PCS 4 are configured as normally-closed (NC) devices in the HCM 140 of FIG. 2A, only clutch C3 remains available. Accordingly, neutral (N) is established as the single default condition using the HCM 140 of FIG. 2A.

Referring to FIG. 5B, with each of the blocking valves X, Y of FIG. 2B turned off, all four clutches C1-C4 are available. However, when the blocking valve X is turned on, clutch C1 is effectively blocked, and when the blocking valve Y is turned on, the clutch C2 and C3 are effectively blocked. In the event of a power failure at the ECU 36 of FIG. 1, the default mode depends on the position of the blocking valve Y. As the power failure would prevent line pressure ($P_L$) from reaching the trim valve T1 and T3 due to the normally-closed configuration of solenoid devices PCS1 and PCS3, clutches C1 and C3 are rendered unavailable. As shown in FIG. 3, actuation of clutches C2 and C4 can establish EVT mode 3 (M3). If Y is unlatched, therefore, M3 is the default. If Y is latched (L) at the time of the power failure, however, it will remain in an "on" or "L" state, thus blocking the clutch C2. Accordingly, a neutral mode utilizing clutch C4 can be established as a second power failure mode using the HCM 240 of FIG. 2B.

Referring to FIG. 5C, with each of the blocking valves X, Y of FIG. 2C turned off, all four clutches C1-C4 are available. However, when the blocking valve X is turned on it latches (L), the clutch C1 is blocked, and the clutch C2 is directly connected to line pressure ($P_L$). When the blocking valve Y is turned on, the feed to trim valve T3 is blocked, and the feed to trim valve T2 may be blocked in the event the blocking valve X is not on at that time, as determined by the pressure signal (arrow $i_P$). In the event of a power failure at the ECU 36 of FIG. 1, the default mode depends on the respective positions of the blocking valves X, Y. As the power failure would prevent line pressure ($P_L$) from reaching the trim valves T2 and T4 due to the normally-closed configuration of solenoid devices PCS2 and PCS4, clutch C4, an potentially clutch C2, are rendered unavailable, with the availability of the clutch C2 being dependent on the position of the blocking valve X. As shown in FIG. 3, actuation of clutches C1 and C3 can establish EVT mode 1 (M1). If X and Y are both latched, only C2 remains available, and therefore a neutral state using the clutch C2 is provided as a default state.

If only Y is latched at the time of the power failure, it will remain in an "on" or latched "L" state, thus blocking clutches C2 and C3. With clutch C4 unavailable due to the normally-closed configuration of PCS4, a neutral mode utilizing clutch C1 is provided as another default mode. However, if only X is latched at the time of the power failure, it will remain in an "on" or "L" state, thus blocking clutch C1. With clutch C4 unavailable due to the normally-closed configuration of PCS4, clutches C2 and C3 remain available for establishing EVT mode 4 (M4) as another default EVT mode, as shown in FIG. 3.

Finally, if neither of the blocking valves X and Y are latched at the time of the power failure to the ECU 36 of FIG. 1, and with clutches C2 and C4 rendered unavailable by the normally-closed configuration of PCS 2 and 4, respectively, clutches C1 and C3 remain available. Using clutches C1 and C3, EVT mode 1 (M1) is provided as another default EVT. Accordingly, a pair of neutral (N) modes and a pair of EVT modes (M1, M4) can be established as power failure modes using the HCM 340 of FIG. 2C. Those of ordinary skill in the art will recognize that other EVT modes such as M2 and M3 can also be established via different combinations of normally-closed solenoid devices with the blocking valves X, Y, depending on the desired design of the EVT 12 of FIG. 1.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission (EVT) for a vehicle, the EVT being operable for selectively establishing a plurality of transmission operating modes including a neutral mode and a plurality of EVT modes providing progressively higher speed/lower torque conditions, the EVT comprising:
   a source of pressurized fluid;
   a plurality of clutches each being selectively engagable using pressurized fluid from said source;
   a plurality of solenoid-actuated valves each configured to control a flow of said pressurized fluid to at least one of said plurality of clutches, said plurality of solenoid-actuated valves including:
      a first, a second, a third, and a fourth trim valve each selectively controlling an admission of said pressurized fluid into at least one of said plurality of clutches; and
      a first and a second blocking valve for selectively blocking an admission of said pressurized fluid into at least one of said first, second, third, and fourth trim valves, wherein one of said first and said second blocking valves is a latching device having a first and a second position; and
   an electronic control unit (ECU) operable for selectively actuating different combinations of said plurality of solenoid-actuated valves to thereby establish the plurality of transmission modes based at least partially on a speed of the vehicle;
   wherein said plurality of solenoid-actuated valves are configured to provide the EVT with multiple different default modes in the event of an electrical power failure at said ECU, said default modes including the neutral mode when said latching device is latched in the first position after said electrical power failure, and an EVT mode selected from the plurality of EVT modes that is established when the latching device is latched in the second position after said electrical power failure.

2. The EVT of claim 1, wherein said default modes further include a predetermined pair of EVT modes selected from the plurality of EVT modes; and
   wherein each of said first and said second blocking valves is configured as the latching device suitable for establishing said predetermined pair of EVT modes as a pair of said default modes.

3. The EVT of claim 2, wherein the plurality of EVT modes includes a first, a second, a third, and a fourth EVT mode each adapted for use at progressively higher speed/lower torque conditions;
   wherein said default modes include the neutral mode when neither of said latching devices are latched in the first position after said electrical power failure;
   wherein one of said predetermined pair of EVT modes is said first EVT mode when one of said latching devices is latched in said first position and the other is latched in said second position after said electrical power failure; and
   wherein another of said predetermined pair of EVT modes is said fourth EVT mode when each of said latching devices are latched in said second position after said electrical power failure.

4. A hydraulic control module (HCM) for an electrically-variable transmission (EVT) having a plurality of fluid-actuated clutches and a plurality of valves each selectively controlled by a corresponding electro-mechanical solenoid device, the plurality of valves including a first and a second blocking valve, the HCM comprising:
   a supply of pressurized fluid;
   an electronic control unit (ECU) operable for selecting one of the different transmission modes based at least partially on a speed of the vehicle, said ECU being adapted to control the open and closed state of each of the plurality of valves by selectively actuating the corresponding electro-mechanical solenoid device, and wherein said open state allows an admission of said pressurized fluid into a corresponding one of the fluid-actuated clutches;
   wherein the second blocking valve is configured as a latching device, and wherein the HCM:
      provides the EVT with multiple different default modes in the event of an electrical power failure at said ECU;
      allows the EVT to default to a neutral mode as one of said default modes when said first blocking device is on and said second blocking device is latched during said electrical power failure; and
      allows the EVT to default to a predetermined single EVT mode as another of said default modes when said first blocking device is on and said second blocking valve is not latched during said electrical power failure.

5. The HCM of claim 4, wherein the plurality of fluid-actuated clutches includes a first, second, third, and fourth clutch each controlled by a dedicated trim valve;
   wherein the
      first blocking valve is configured to selectively block a flow of said pressurized fluid to said first clutch; and
      said second blocking valve is configured to selectively block a flow of said pressurized fluid to the second and third clutch, wherein said first and said second blocking valves are configured as latching devices; and
   wherein the HCM allows the EVT to default to: said neutral mode when said second blocking valve is latched during said electrical power failure; a first EVT mode when said first blocking valve is latched and said second blocking valve is not latched during said electrical power failure;

and a second EVT mode when neither of said first and said second blocking valves are latched during said electrical power failure.

6. The HCM of claim 5, wherein the EVT is configured to provide four different EVT modes each providing progressively higher speed/lower torque operation, and wherein said first EVT mode provides the lowest speed/highest torque operation of said four different EVT modes.

* * * * *